US011003786B2

(12) United States Patent
Ahmed et al.

(10) Patent No.: US 11,003,786 B2
(45) Date of Patent: May 11, 2021

(54) SYSTEM AND METHOD TO MANAGE FILE ACCESS RIGHTS IN AN INFORMATION HANDLING SYSTEM

(71) Applicant: DELL PRODUCTS, LP, Round Rock, TX (US)

(72) Inventors: Minhaj Ahmed, Allen, TX (US); Daniel L. Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 290 days.

(21) Appl. No.: 15/993,388

(22) Filed: May 30, 2018

(65) Prior Publication Data

US 2019/0370480 A1 Dec. 5, 2019

(51) Int. Cl.
*G06F 21/62* (2013.01)
*G06F 16/11* (2019.01)

(52) U.S. Cl.
CPC ........ *G06F 21/6218* (2013.01); *G06F 16/122* (2019.01)

(58) Field of Classification Search
CPC ............... G06F 21/6218; G06F 21/122; G06F 21/62–629
See application file for complete search history.

(56) References Cited

U.S. PATENT DOCUMENTS

| 5,377,269 | A | * | 12/1994 | Heptig | G06F 21/34 235/380 |
| 5,390,318 | A | * | 2/1995 | Ramakrishnan | G06F 16/902 711/158 |
| 8,190,698 | B2 | | 3/2012 | Sridharan et al. | |
| 8,473,462 | B1 | * | 6/2013 | Banerjee | G06F 11/1451 707/640 |
| 8,613,108 | B1 | * | 12/2013 | Aggarwal | H04L 63/101 455/411 |
| 9,285,979 | B2 | | 3/2016 | Tjissen | |
| 2003/0050919 | A1 | * | 3/2003 | Brown | G06F 21/6218 |
| 2006/0015731 | A1 | * | 1/2006 | Lakshmi Narayanan | H04L 9/3242 713/176 |
| 2006/0150247 | A1 | * | 7/2006 | Gafken | G06F 21/6281 726/17 |
| 2006/0182084 | A1 | | 8/2006 | Ionescu | |

(Continued)

*Primary Examiner* — Matthew T Henning
(74) *Attorney, Agent, or Firm* — Larson Newman, LLP (57) ABSTRACT

An information handling system for securely storing a file includes a storage device and a processor that instantiates an operating system, a file system filter driver, and a storage device driver. The file system filter driver receives the file and access information from the operating system, combines the file and the access information to provide a secure file, and stores the secure file via the storage device driver on the storage device. The file system filter driver further receives a request for the secure file from the operating system, directs the storage device driver to retrieve the access information from the secure file on the storage device, and determines if the request is authorized based upon the access information. In response to the request being authorized, the file system filter driver directs the storage device driver to retrieve the secure file from the storage device, and provides the secure file to the operating system.

17 Claims, 5 Drawing Sheets

(56) References Cited

U.S. PATENT DOCUMENTS

| | | | |
|---|---|---|---|
| 2008/0162353 A1* | 7/2008 | Tom | G06F 21/10 |
| | | | 705/51 |
| 2009/0193524 A1* | 7/2009 | Shoji | G06F 21/53 |
| | | | 726/27 |
| 2011/0010516 A1* | 1/2011 | Donatiello | G07F 7/1008 |
| | | | 711/163 |
| 2015/0143233 A1 | 3/2015 | Weksler et al. | |
| 2016/0371488 A1* | 12/2016 | Benkert | G06F 3/0622 |

* cited by examiner

SYSTEM AND METHOD TO MANAGE FILE ACCESS RIGHTS IN AN INFORMATION HANDLING SYSTEM

FIELD OF THE DISCLOSURE

This disclosure generally relates to information handling systems, and more particularly relates to managing file access rights in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system for securely storing a file may include a storage device and a processor that instantiates an operating system, a file system filter driver, and a storage device driver. The file system filter driver may receive the file and access information from the operating system, combine the file and the access information to provide a secure file, and store the secure file via the storage device driver on the storage device. The file system filter driver may further receive a request for the secure file from the operating system, direct the storage device driver to retrieve the access information from the secure file on the storage device, and determine if the request is authorized based upon the access information. In response to the request being authorized, the file system filter driver may further direct the storage device driver to retrieve the secure file from the storage device, and provide the secure file to the operating system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
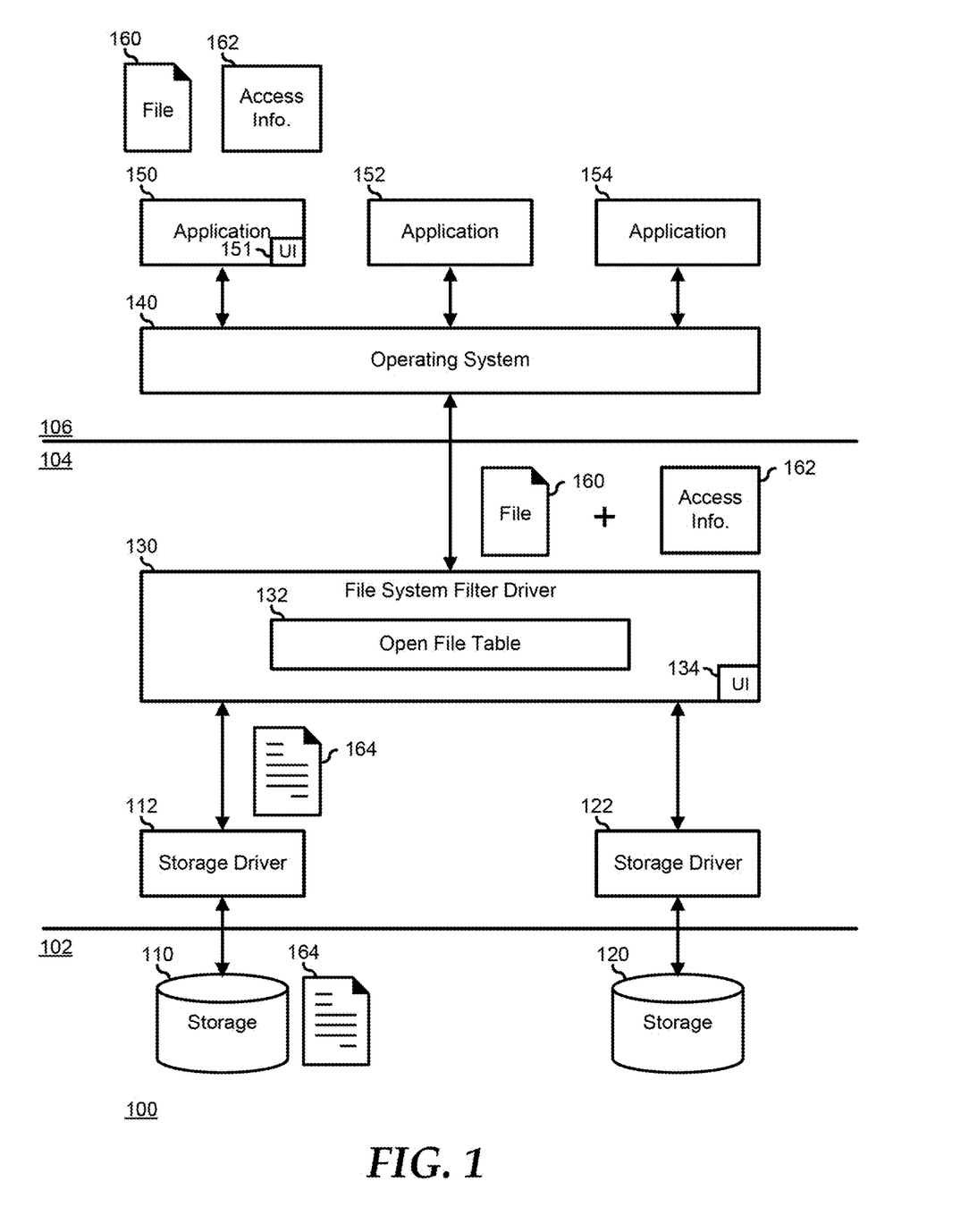
FIG. 1 is a block diagram of an information handling system according to an embodiment of the present disclosure.

FIG. 1 illustrates an information handling system 100 including a hardware layer 102, a firmware layer 104, and a software layer 106. Hardware layer 102 includes a storage array 110 and a storage array 120. Hardware layer 102 represents the hardware elements of information handling system 100. As such, in addition to storage arrays 110 and 120, hardware layer 102 includes processors, I/O interfaces, I/O devices, memory devices, and the like that operate to perform the data processing functions of information handling system 100. As described herein, the teachings describing the operation, functions, and features of storage arrays 110 and 120 can similarly be applied to other data storage devices of information handling system 100, such as random access memory (RAM) devices, non-volatile RAM (NVRAM) devices, read only memory (ROM) devices, hard disk drives (HDDs), solid state drives (SSDs), or other data storage devices, as needed or desired. Storage arrays 110 and 120 operate to store data. In particular, storage arrays 110 and 120 may include associated storage controllers, such as a RAID controller or the like, such that, for example, a file 164 stored on storage array 110 is physically stored in separate locations on one or more storage device of the storage array.

Firmware layer 104 includes storage drivers 112 and 122, and a file system filter driver 130. Storage drivers 112 and 122 represent interfaces for receiving file level data storage commands from elements of firmware layer 104 and software layer 106, and translating the file level data storage commands into operations that are performed on respective storage arrays 110 and 120. Storage drivers 112 and 122 can be provided by one or more option ROM, by a Basic Input/Output System (BIOS), by a Unified Extensible Firmware Interface (UEFI), or another firmware source of information handling system 100. File system filter driver 130 represents a firmware component that modifies the behavior of the file system utilized by an operating system 140 of software layer 106, and can typically operate as a firmware level function of the operating system. In contrast to storage drivers 112 and 122, which are specific to respective storage arrays 110 and 120, and other drivers that are likewise specific to associated hardware devices, file system filter driver 130 provides additional operations which can be carried out to manage storage operations, such as creating, opening, closing, and enumerating files and directories; getting and setting file, directory, and volume information; and reading and writing file data. In addition to file system filter driver 130, firmware layer 104 can include one or more additional filter drivers which provide applications such as antivirus utilities, encryption programs, and hierarchical storage management systems.

File system filter driver 130 operates to enhance the file system of operating system 140 to provide restricted access to files stored on storage arrays 110 and 120, to control copying and sharing of the files, to implement life-cycle controls on the files, and to otherwise protect the files at a system level. Generally, file system filter driver 130 operates to receive files from software layer 106, along with access information related to access restrictions for the files, to append the access information to the files as a file wrapper, and to store the modified file with the file wrapper to one or more of storage arrays 110 and 120. As such, file system filter driver 130 is shown as receiving a file 160 and access information 162 from software layer 106, and providing a modified file 164 to storage driver 112 to perform file operations on storage array 110. Henceforth, file 164 will be referred to as secure file 164 to distinguish file 164, which includes access information 162, from file 160, which is separate from the access information. Additional operations, functions, and features of file system filter driver 130 will be described further below.

Software layer 102 includes an operating system 140 that instantiates applications 150, 152, and 154. Applications 150, 152, and 154 represent software that runs under the control of operating system 140. For the purpose of this disclosure, an application is characterized by the fact that it can create, open, modify, edit, close, and store various types of files, where a file represents a unit of data that is handled by a file system of information handling system 100 as a single, indivisible unit. In general, a file may be associated with various information that is usable by a human operator, such as office productivity documents like word processor documents, presentation documents, databases, spreadsheets, various markup language documents, such as HTML documents, XML documents, and the like, or other types of office productivity documents. Other human-usable information may include various content-based documents, such as media files, audio files, video files, or other content-based file types. In addition, a document may be associated with other types of information that may not typically be associated as human-usable content, such as data, executables, drivers, or other files, as needed or desired. Thus, for the purposes of this disclosure, a document is characterized by the fact that it can be created, opened, modified, edited, closed, stored, called, executed, or otherwise invoked by an application.

Figure 2:
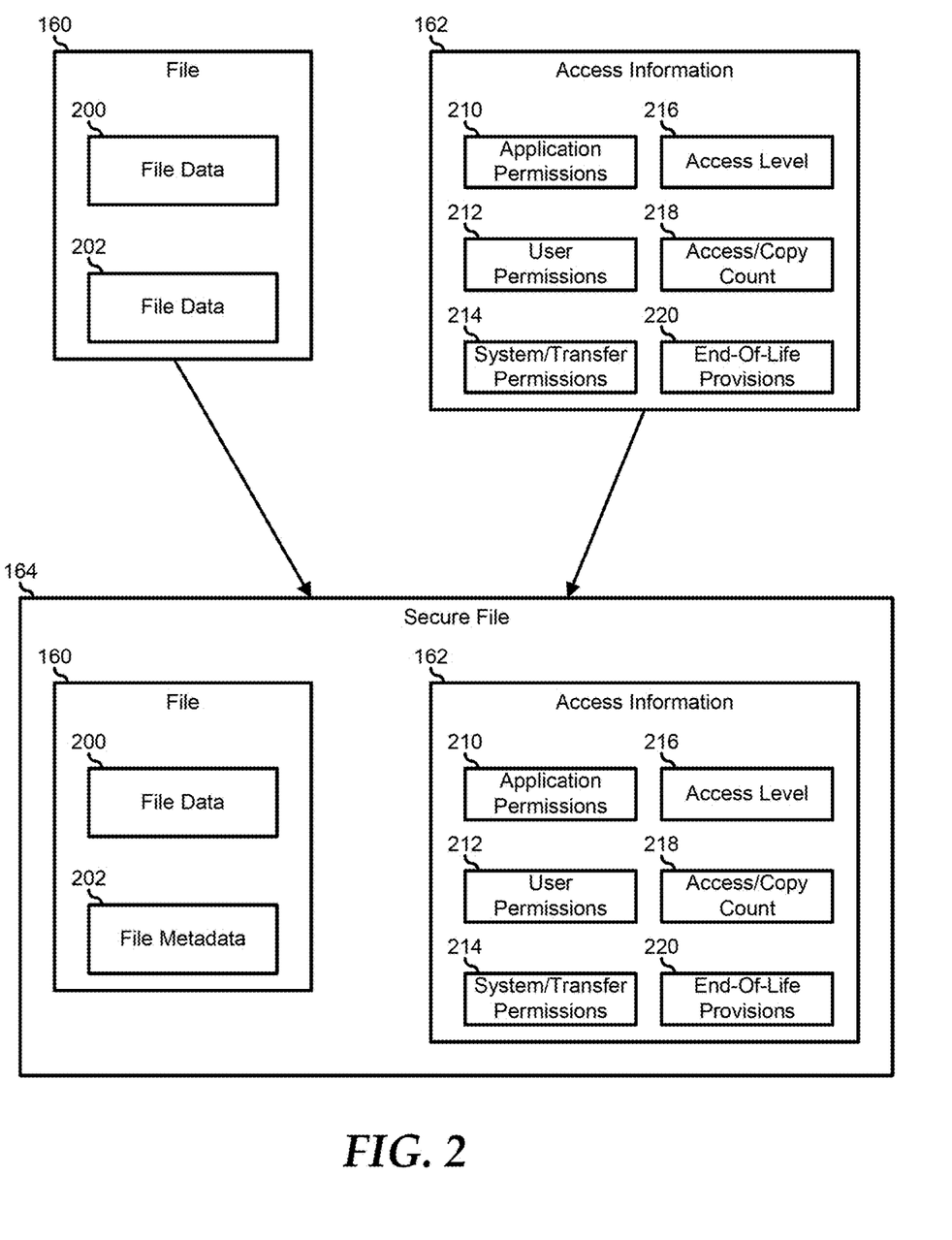
FIG. 2 illustrates a secure file handled according to an embodiment of the present disclosure.

In general, a user of application 150 creates file 160 and the associated access information and then invokes a file system command to store the file to storage array 110. FIG. 2 illustrates in greater detail file 160, access information 162, and secure file 164. File 160 includes file data 200 and file metadata 202. File data 200 represents the working content of file 160. For example, where file 160 represents an office productivity document, file data 200 represents the user created information that is the subject of the document. File metadata 202 represents information of file 160 that is added to the file by the program upon which the file was created. For example, an office productivity program may include a user name of the user who created the file, a data on which the file was created or modified, or other information, as needed or desired.

Access information 162 includes information fields that define the contours of the document security that are to be associated with file 160. In a particular embodiment, application 150 includes a user interface 151 that is presented to the user who creates file 160 whenever the user invokes a file related operation, such as a save-file operation, a copy-file operation, a rename-file operation, a delete-file operation, or the like. User interface 151 operates to present the user with various options for controlling the file security that will be implemented by file system filter driver 130, as described further below. Once the various control options are selected, user interface 151 operates to create access information 162. In a particular embodiment, the functions and features of user interface 151 are provided by a user interface 134 of file system filter driver 130. Here, when the user who created file 160 invokes a file related operation, user interface 134 presents the user with the various options to define the access restrictions for the file.

The information fields of access information 162 include an application permissions field 210, a user permissions field 212, a system and transfer permissions field, an access level field, an access and copy count limit field, and an end-of-life provisions field. Application permissions field 210 provides a list of applications which are usable for opening, editing, saving, renaming, or otherwise manipulating file 160 on the file system of information handling system 100. For example, it may be determined that providing access control for actions like cutting and pasting information from a document are less easily controlled in a text editor environment than in a word processor environment. Here, application permissions field 210 may positively describe a list of acceptable word processor applications which may be utilized to open file 160, or, in the alternative, the application permissions field may negatively describe a list of unacceptable text editor applications which may not be utilized to open the file. Application permissions field 210 further provides an indication as to what sorts of manipulations may be done to file 160. For example, application permissions field 210 may provide that file 160 is a read-only file, a read-copy file, a read-edit-save file, that the application may delete the file if other access permissions permit or dictate it, or other manipulations to the file, as needed or desired. User permissions field 212 provides a list of users who are authorized to manipulate file 160.

System and transfer permissions field 214 provides indications as to how file 160 may be transferred within information handling system 100 and outside of the information handling system. For example, system and transfer permissions field 214 may specify that file 160 and its derivatives may only be stored on storage array 110, and not on storage array 120. Here, storage array 120 may represent a removable memory storage device, such as a USB thumb drive, or the like. In this way, file 160 is protected from being taken off of information handling system 100. In another example, system and transfer permissions field 214 may specify that file 160 and its derivatives may only be transferred to another information handling system with an authenticated file system filter driver similar to file system filter driver 130, thereby preventing the file from being copied to insecure information handling systems. In yet another example, system and transfer permissions field 214 may specify that file 160 and its derivatives may not be transferred via a network interface device, thereby preventing the posting of the file to an unauthorized network resource. Here, system and transfer permissions field 214 may further specify that transfer via a network interface over a particular virtual private network (VPN) may be permitted.

Access level field 216 specifies an authentication access level that information handling system 100 is authenticated to in order to provide access to file 160. For example, where information handling system 100 is a multi-user system, the information handling system may operate in a restricted state where multiple users can access limited resources of the information handling system, or in a secure state where an authenticated user has access to the full resources of the information handling system. The user may place information handling system 100 into the authenticated state by undergoing an authentication procedure such as a username/password authentication, a biometric authentication, or the like. Here, access level field 216 can specify that information handling system 100 must be in the authenticated state in order to provide access to file 160.

Access and copy count limit field 218 specifies limits to a number of times that file 160 can be accessed or copied. Here, accesses and copies may be tracked as separate occurrences, and thus access and copy count limit field 218 can represent separate fields, one for the access count and the other for the copy count. On the other hand, accesses and copies may be tracked together. Here access and copy count limit field 218 can represent a single field. In another embodiment, access and copy count limit field 218 may include a time-stamp which places time span within which access is permitted, but after which no further access is permitted. For example, where a statutory record keeping requirement needs to be met, file 160 may be designated as being archived after the specified time. End-of-life provisions field 220 specifies how file 160 is to be handled after it has counted-out or timed-out. For example, as noted above, file 160 can be archived for statutory purposes, the file can be deleted, can be converted to a read-only file, or the like. After access information 162 is created, by either of user interfaces 151 or 134, file system filter driver 130 operates to combine file 160 with access information 162 to create secure file 164, and to store the secure file onto storage array 110.

After secure file 164 is stored to storage array 110, file system filter driver 130 operates to manage and control the storage commands for the secure file from software layer 106 and from applications 150, 152, and 154. Here, whenever a storage command is detected by file system filter driver 130 for secure file 164, the file system filter driver retrieves the secure file from storage array 110 and checks whether the storage command is permissible based upon access information 162 retrieved from the secure file. As such, when file system filter driver 130 receives a storage command for secure file 164, the file system filter driver also receives other information that permits the file system filter driver to determine whether or not to perform the storage command. For example, file system filter driver 130 can receive various indications from operating system 140 as to which one of applications 150, 152, and 154 was the source of the storage command, which user requested the secure file, whether the access is a copy or transfer request, what access level information handling system 100 is operating in, or other indications as needed or desired. Then, file system filter driver 130 can verify whether the requested storage command is permitted based upon the various fields of the access information of secure file 164. If so, file system filter driver 130 executes the storage command. If not, file system filter driver 130 disregards the storage command. Here, in a particular embodiment, file system filter driver 130 can provide an indication as to which access condition was not satisfied back to operating system 140, and can log the failed storage command in an error log of the information handling system. In this way, file system filter driver 130 operates to ensure that secure file 164 is not mishandled by being opened by unauthorized applications or users, transferred to an unauthorized storage device or network, opened or manipulated when information handling system 100 is not in an authenticated state, opened or copied too many times, or otherwise mishandled.

File system filter driver 130 also operate to access, implement, and maintain access to secure file 164 in accordance with the contents of access and copy count limit field 218 and end-of-life provisions field 220. For example, where there is a copy or end-of-life limit implemented in access information 162, then each time secure file 164 is accessed, file system filter driver 130 can increment a counter in the access information and determine if the access counter has reached the limit. When the access counter reaches the limit, file system filter driver 130 operates to implement the end-of-life provisions as provided in end-of-life provisions field 220.

In a particular embodiment, file system filter driver 130 includes an open file table 132. Here, when file system filter driver 130 retrieves secure file 164, the file system filter driver stores the access information for the secure file in open file table 132. In this way, when secure file 164 is opened, and additional storage operations are requested, file system filter driver 130 evaluates the request against the copy of the access information stored in open file table 132, and does not need to retrieve the secure file from storage array 110, thereby saving storage I/O bandwidth. In another embodiment, rather than retrieving secure file 164, when a storage command is detected by file system filter driver 130 for the secure file, the file system filter driver retrieves only the access information portion of the secure file from storage array 110 until such time that it is determined whether or not the storage command is authorized. If so, then file system filter driver 130 retrieves the entirety of secure file 164 to provide the secure file to the requestor.

Other elements of information handling system 100 can perform one or more of the functions of file system filter driver 130. For example, one or more of applications 150, 152, and 154 can create secure file 164 directly, etc. In another example, one or more of the functions ascribed to file system filter driver 130 may be performed by operating system 140, as needed or desired. While described herein in the context of content files, the teachings of this disclosure are not limited thereto. In particular, any file for which it is desired to provide access protection may be subject to the operation of a file system filter driver similar to file system filter driver 130. For example, operating system files, firmware files, and the like can be protected in a file system via the implementation of a file system filter driver like file system filter driver 130 to prevent malicious tampering with the operation of the operating system. Other needs for protecting the access to files are known in the art, and are likewise subject to the benefits of the use of a file system filter driver similar to file system filter driver 130, and are therefore specifically considered to be included in the teachings of the present disclosure.

Figure 3:
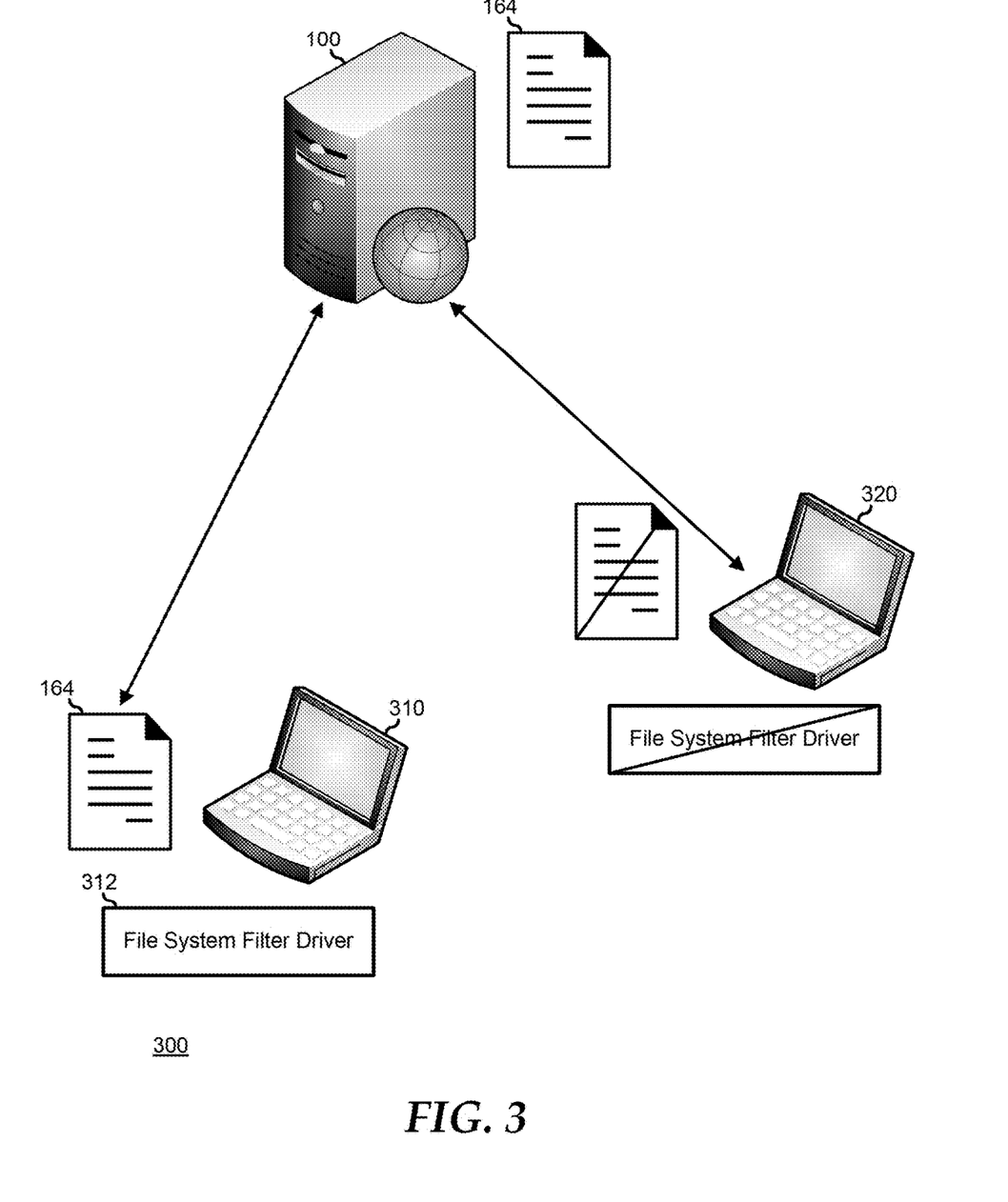
FIG. 3 is a block diagram of a document handling system according to an embodiment of the present disclosure.

FIG. 3 is a document handling system 300 including information handling systems 100, 310, and 320. Information handling systems 310 is similar to information handling system 100 in that information handling system 310 includes a file system filter driver 312 similar to file system filter driver 130. Information handling system 320 differs from information handling system 100 in that information handling system 320 does not include a file system filter driver similar to file system filter driver 130. Here, when information handling system 100 receives a request to access secure document 164 for one of information handling systems 310 or 320, file system filter driver 130 determines first if the requesting information handling system is authorized to access the secure file. If so, then file system filter driver 130 further determines if the requesting information handling system includes a file system filter driver. If not, the access request is denied. However, if the requesting information handling system includes a file system filter driver, then file system filter driver 130 provides access to secure file 164 to the requesting information handling system. For example, assuming both information handling systems 310 and 320 are authorized to access secure file 164, then a request to access the secure file from information handling system 310 will be granted because information handling system 310 includes file system filter driver 312, and a request to access the secure file from information handling system 320 will not be granted because information handling system 320 does not include a file system filter driver. In this way, file system filter driver 130 operates to ensure that only information handling systems that are equipped to securely access secure file 164 are permitted to access the secure file. In a particular case, when the access request comes from operating system 140 or applications 150, 152, or 154, then file system filter driver 130 operates to query the targeted information handling system, requesting an indication as to whether or not the targeted information handling system includes a file system filter driver similar to file system filter driver 130. In another case, when the access request comes from one of information handling systems 310 or 320, the access request includes the indication that the requesting information handling system includes a file system filter driver.

Figure 4:
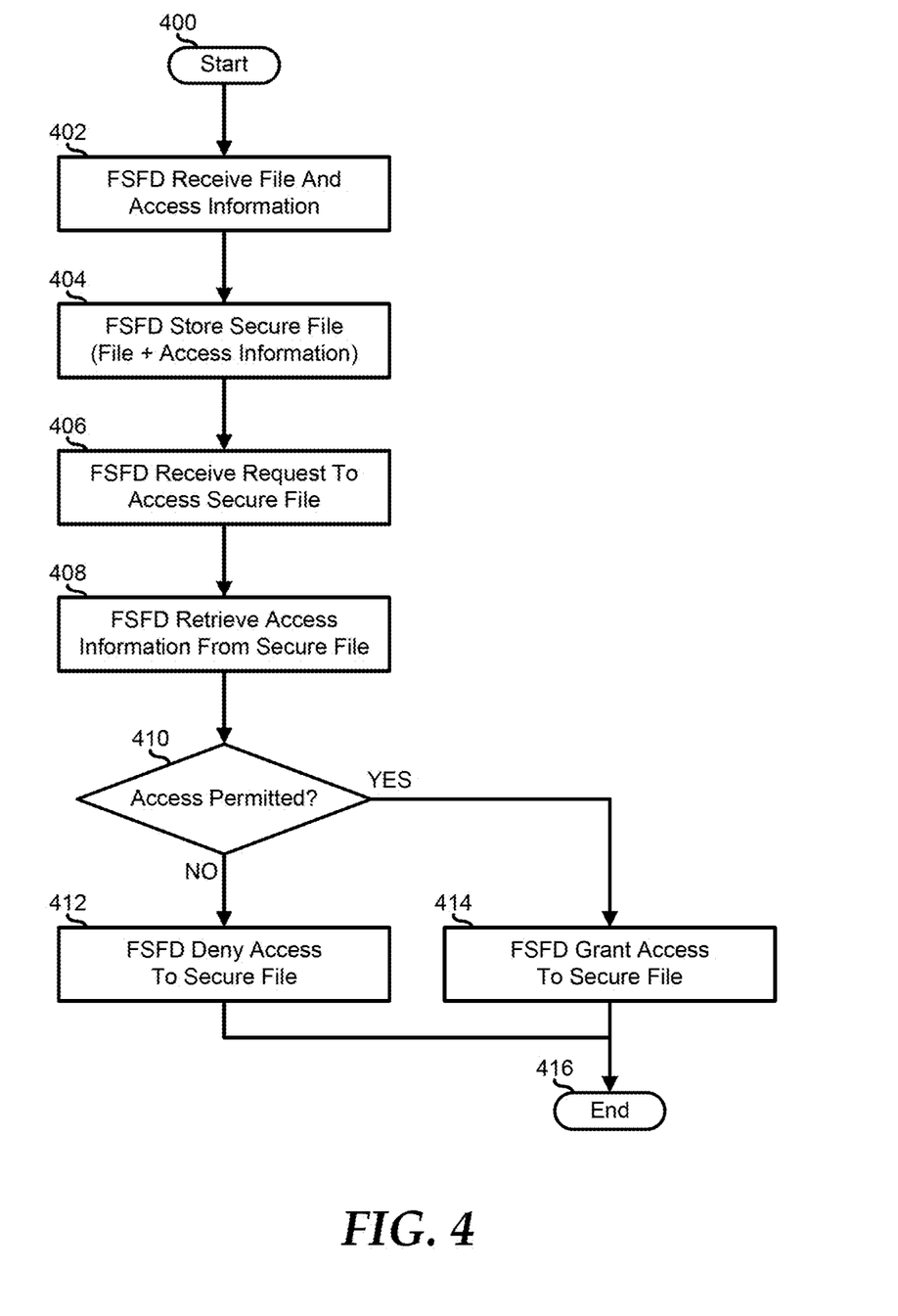
FIG. 4 is a flowchart illustrating a method of managing file access rights in an information handling system.

FIG. 4 is illustrates a method of managing file access rights in an information handling system, starting at block 400. A file system filter driver receives a file and access information associated with the file in block 402. For example, file system filter driver 130 can receive file 160 and access information 162 from one of applications 150, 152, or 154, or from operating system 140. In another example, file system filter driver 130 can receive file 160, and can provide user interface 134 to a user to provide access information 162. The file system filter driver creates a secure file from the received file and the access information and stored the secure file to a storage device in block 404.

The file system filter driver receives an access request, such as a file system command, to access the secure file in block 406. The file system filter driver retrieves at least the access information from the secure file in block 408, and a decision is made as to whether or not the access information indicates that the access request is permitted in decision block 410. If not, the "NO" branch of decision block 410 is taken, the file system filter driver denies the access request in block 412, and the method ends in block 418. Here, the file system filter driver can provide an error indication or log of the declined access request. If the access information indicates that the access request is permitted, the "YES" branch of decision block 410 is taken, the file system filter driver grants the access request in block 414, and the method ends in block 416.

Figure 5:
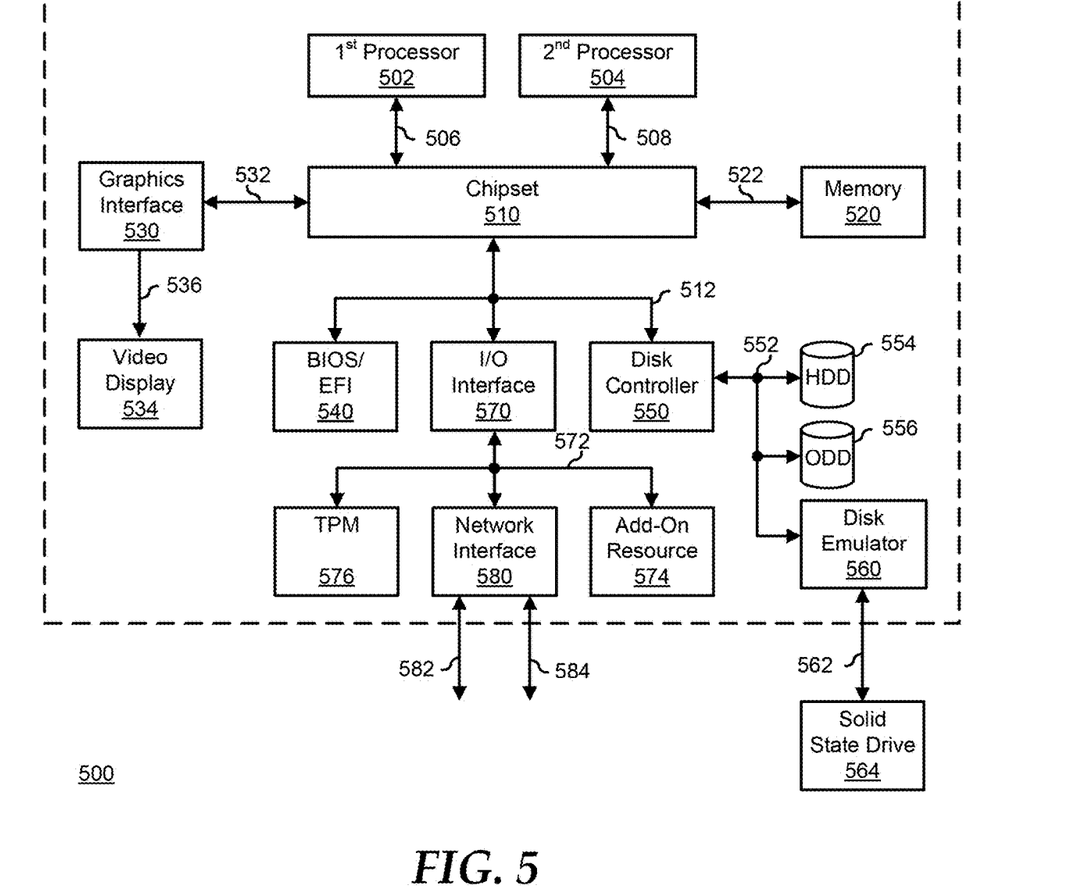
FIG. 5 is a block diagram illustrating a generalized information handling system according to an embodiment of the present disclosure.

FIG. 5 illustrates a generalized embodiment of information handling system 500. For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described above, and operates to perform one or more of the methods described above. Information handling system 500 includes a processors 502 and 504, a chipset 510, a memory 520, a graphics interface 530, include a basic input and output system/extensible firmware interface (BIOS/EFI) module 540, a disk controller 550, a disk emulator 560, an input/output (I/O) interface 570, and a network interface 580. Processor 502 is connected to chipset 510 via processor interface 506, and processor 504 is connected to the chipset via processor interface 508. Memory 520 is connected to chipset 510 via a memory bus 522. Graphics interface 530 is connected to chipset 510 via a graphics interface 532, and provides a video display output 536 to a video display 534. In a particular embodiment, information handling system 500 includes separate memories that are dedicated to each of processors 502 and 504 via separate memory interfaces. An example of memory 520 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 540, disk controller 550, and I/O interface 570 are connected to chipset 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 540 includes BIOS/EFI code operable to detect resources within information handling system 500, to provide drivers for the resources, initialize the resources, and access the resources. BIOS/EFI module 540 includes code that operates to detect resources within information handling system 500, to provide drivers for the resources, to initialize the resources, and to access the resources.

Disk controller 550 includes a disk interface 552 that connects the disc controller to a hard disk drive (HDD) 554, to an optical disk drive (ODD) 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits a solid-state drive 564 to be connected to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O interface 570 includes a peripheral interface 572 that connects the I/O interface to an add-on resource 574, to a TPM 576, and to network interface 580. Peripheral interface 572 can be the same type of interface as I/O channel 512, or can be a different type of interface. As such, I/O interface 570 extends the capacity of I/O channel 512 when peripheral interface 572 and the I/O channel are of the same type, and the I/O interface translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as chipset 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system for securely storing a file, the information handling system comprising:
a storage device; and
a processor configured to execute code to instantiate an operating system, a first file system filter driver, and a storage device driver;
wherein the first file system filter driver:
receives the file and access information from the operating system;
combines the file and the access information to provide a secure file;
stores the secure file via the storage device driver on the storage device;
receives a request for the secure file from the operating system;
determines whether or not the request is from a system external to the information handling system;
determines that the system external to the information handling system is authorized to access the secure file based upon the access information when the request is from the system external to the information handling system;
determines that the system external to the information handling system includes a second file system filter driver when the system external to the information handling system is authorized to access the secure file;
denies the operating system access to the secure file when the system external to the information handling system does not include the second file system filter driver;
determines that the request is authorized based upon the access information when the system external to the information handling system includes the second file system filter driver;
denies the operating system access to the secure file when the request is not authorized; and
in response to the request being authorized:
directs the storage device driver to retrieve the secure file from the storage device; and
provides the secure file to the system external to the information handling system.

2. The information handling system of claim 1, wherein, in response to the request being not authorized, the first file system filter driver further:
denies the operating system access to the secure file.

3. The information handling system of claim 2, wherein, in further response to the request being not authorized, the first file system filter driver:
provides an indication to the operating system that the operating system is denied access to the secure file.

4. The information handling system of claim 2, wherein, in further response to the request being not authorized, the first file system filter driver:
provides a log that the operating system was denied access to the secure file.

5. The information handling system of claim 1, wherein the access information includes an access count, and wherein in response to directing the storage device driver to retrieve the access information, the first file system filter driver further:
determines if a counter of the access information of the access information exceeds a count limit of the access information; and
in response to the counter exceeding the count limit, denies the operating system access to the secure file.

6. The information handling system of claim 5, wherein, in response to the counter not exceeding the count limit, the first file system filter driver further:
modifies the access information to increment the counter; and
directs the storage driver to store the modified access information to the secure file on the storage device that the request is from the application.

7. The information handling system of claim 6, wherein in further response to the counter exceeding the count limit, the first file system filter driver:
determines that the access information specifies to delete the secure file when the counter exceeds the count limit; and
directs the storage device driver to delete the secure file from the storage device in response to determining that access information specifies to delete the secure file when the counter exceeds the count limit.

8. The information handling system of claim 1, wherein the access information includes an identification of an application, and wherein in determining if the request is authorized, the first file system filter driver further:
determines that the request is from the application.

9. The information handling system of claim 1, wherein the access information includes an identification of an user, and wherein in determining if the request is authorized, the first file system filter driver further:
determines that the request is from the user.

10. A method for securely storing a file, the method comprising:
receiving, by a first file system filter driver instantiated on an information handling system, the file and access information from an operating system instantiated on the information handling system;
combining, by the first file system filter driver, the file and the access information to provide a secure file;
storing, by a storage driver instantiated on the information handling system, the secure file on a storage device of the information handling system;
receiving, by the first file system filter driver, a request for the secure file from the operating system;
determining whether or not the request is from a system external to the information handling system;
determining that the system external to the information handling system is authorized to access the secure file based upon the access information when the request is from the system external to the information handling system
determining that the system external to the information handling system includes a second file system filter driver when the system external to the information handling system is authorized to access the secure file;
denying the operating system access to the secure file when the system external to the information handling system does not include the second file system filter driver;
determining, by the first file system filter driver, that the request is authorized based upon the access information when the system external to the information handling system includes the second file system filter driver;
denying the operating system access to the secure file when the request is not authorized; and
in response to the request being authorized:
directing, by the first file system filter driver, the storage device driver to retrieve the secure file from the storage device; and
providing, by the first file system filter driver, the secure file to the system external to the information handling system.

11. The method of claim 10, wherein, in response to the request being not authorized, the method further comprises:
denying, by the first file system filter driver, the operating system access to the secure file.

12. The method of claim 11, wherein, in further response to the request being not authorized, the method further comprises:
providing, by the first file system filter driver, an indication to the operating system that the operating system is denied access to the secure file.

13. The method of claim 11, wherein, in further response to the request being not authorized, the method further comprises:
providing, by the first file system filter driver, a log that the operating system was denied access to the secure file.

14. The method of claim 10, wherein the access information includes an access count, and wherein in response to directing the storage device driver to retrieve the access information, the method further comprises:

determining, by the first file system filter driver, if a counter of the access information of the access information exceeds a count limit of the access information; and in response to the counter exceeding the count limit, denying, by the first file system filter driver, the operating system access to the secure file.

15. The method of claim 14, wherein, in response to the counter not exceeding the count limit, the method further comprises:

modifying, by the first file system filter driver, the access information to increment the counter; and directing, by the first file system filter driver, the storage driver to store the modified access information to the secure file on the storage device that the request is from the application.

16. The method of claim 15, wherein in further response to the counter exceeding the count limit, the method comprises:

determining, by the first file system filter driver, that the access information specifies to delete the secure file when the counter exceeds the count limit; and directing, by the first file system filter driver, the storage device driver to delete the secure file from the storage device in response to determining that access information specifies to delete the secure file when the counter exceeds the count limit.

17. The method of claim 10, wherein the access information includes an identification of an application, and wherein in determining if the request is authorized, the method further comprises:

determining, by the first file system filter driver, that the request is from the application.

* * * * *